United States Patent
Noll et al.

(10) Patent No.: US 8,116,817 B2
(45) Date of Patent: *Feb. 14, 2012

(54) METHOD TO CALIBRATE RF PATHS OF AN FHOP ADAPTIVE BASE STATION

(75) Inventors: John R. Noll, Satellite Beach, FL (US); Jeffrey W. Smith, Palm Bay, FL (US); Shannon Tomarchio, Satellite Beach, FL (US); Brady Gaughan, Melbourne, FL (US)

(73) Assignee: Treble Investments Limited Liability Company, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 12/622,956

(22) Filed: Nov. 20, 2009

(65) Prior Publication Data

US 2010/0069120 A1    Mar. 18, 2010

Related U.S. Application Data

(63) Continuation of application No. 11/333,193, filed on Jan. 17, 2006, now Pat. No. 7,643,852.

(51) Int. Cl.
*H04B 1/38* (2006.01)

(52) U.S. Cl. ............... 455/561; 455/63.4; 455/67.11

(58) Field of Classification Search .............. 455/515, 455/516, 517, 62, 63.3, 63.4, 65, 66.1, 67.11, 455/67.14, 67.16, 69, 702, 703, 71, 78, 101, 455/561, 562.1

See application file for complete search history.

(56) References Cited

U.S. PATENT DOCUMENTS

| | | | |
|---|---|---|---|
| 4,107,609 A | * | 8/1978 | Gruenberg ............... 455/16 |
| 5,924,020 A | * | 7/1999 | Forssen et al. ........... 455/129 |
| 6,356,763 B1 | | 3/2002 | Kangas et al. |

(Continued)

FOREIGN PATENT DOCUMENTS

WO    WO2005/050869 A1 *   6/2005

OTHER PUBLICATIONS

Office Action dated Oct. 30, 2008 for U.S. Appl. No. 11/333,193.

(Continued)

*Primary Examiner* — Ping Hsieh
(74) *Attorney, Agent, or Firm* — Snell & Wilmer L.L.P.

(57) ABSTRACT

A method for calibration of RF paths of a frequency hopping adaptive base transceiver station is provided. The method of calibration calibrates a wireless cellular telecommunication system with a frequency hopping adaptive base transceiver station including an adaptive antenna array with two or more RF traffic transceiver apparatus chains. The wireless cellular telecommunication system communicates with mobile units on a frequencies defined by a hop list. The method of calibration includes the step of periodically interrupting a frequency hopping process of the frequency hopping adaptive base transceiver station while calls are in progress. The method of calibration further includes the step of calibrating an antenna transmit path for a RF traffic transceiver apparatus chain at a frequency selected to include one or more frequencies in the hop list to determine a set of weighting parameters for the antenna transmit path at the one or more frequencies. A self-calibrating frequency hopping adaptive base transceiver station is also provided.

13 Claims, 4 Drawing Sheets

U.S. PATENT DOCUMENTS

| | | | |
|---|---|---|---|
| 6,650,881 B1 | 11/2003 | Dogan | |
| 6,931,235 B2 | 8/2005 | Kline et al. | |
| 7,117,014 B1 | 10/2006 | Van Rensburg et al. | |
| 7,218,911 B2 | 5/2007 | Shohara et al. | |
| 7,405,696 B2 * | 7/2008 | Kennedy et al. | 342/417 |
| 2003/0190933 A1 | 10/2003 | Higbie | |

OTHER PUBLICATIONS

Final Office Action dated Apr. 3, 2009 for U.S. Appl. No. 11/333,193.
Advisory Action dated Jun. 8, 2009 for U.S. Appl. No. 11/333,193.
Notice of Allowance dated Aug. 24, 2009 for U.S. Appl. No. 11/333,193.

* cited by examiner though the dampening other signals coming from sources
METHOD TO CALIBRATE RF PATHS OF AN FHOP ADAPTIVE BASE STATION

CROSS-REFERENCE TO RELATED APPLICATIONS

This application is a continuation of U.S. application Ser. No. 11/333,193, filed on Jan. 17, 2006 and entitled, "METHOD TO CALIBRATE RF PATHS OF AN FHOP ADAPTIVE BASE STATION." The Ser. No. 11/333,193 application is incorporated by reference herein in its entirety.

BACKGROUND

1. Statement of the Technical Field

The invention concerns wireless communications equipment, and more particularly, frequency hopping adaptive base stations.

2. Description of the Related Art

A wireless cellular telecommunication system can comprise a base transceiver station (BTS) with an adaptive antenna system. A BTS can communicate with mobile units, such as mobile telephones, through RF links. There are many types of adaptive antenna systems, for example a frequency hopping (FHOP) adaptive base transceiver station. A FHOP adaptive base transceiver station is a BTS that comprises the features of both a FHOP BTS and an adaptive BTS.

A FHOP BTS rapidly changes the frequency of a transmission of the FHOP BTS. A FHOP BTS "hops" from frequency to frequency over a wide band. A code sequence within a FHOP BTS determines the order in which the frequencies are occupied. For example, frequency hopping software can provide a list (hop list) of frequencies for hopping such that a fixed pattern of a given number of frequencies at a given time is performed in repetition.

An adaptive BTS using an adaptive antenna array can increase user capacity over traditional antenna technology by amplifying the signals coming from and going to a mobile unit while dampening other signals coming from sources disposed in other directions. This ability is commonly referred to as "digital beam forming." By steering a beam and positioning multiple nulls, an adaptive array is able to reduce co-channel and adjacent channel interference. This allows each cell to use all frequencies within an operator's licensed band and may even make it possible to use single carrier frequencies more than once within a given cell. An adaptive array separates the multiple signals having the same frequency provided the signals arrive from different angles or otherwise have distinctive propagation paths. In the same manner, multi-path arrivals of a desired signal, which in typical systems degrades signal quality due to inter-symbol interference, is used to define the spatial signature, thus isolating and enhancing the signal from interferers.

An antenna array consists of N identical antenna elements arranged in a particular geometry. The geometry of the array determines spatial resolution of the signals transmitted or received, i.e. the amount of coverage in a given spatial region. Commonly used array types are the uniform linear and circular arrays.

For any given geometry, the phases and amplitudes of the currents exciting the array elements as well as the number of array elements determine the gain of the array in a certain direction. The phases and amplitudes of the currents on the antenna array elements can be electronically adjusted such that received signals from a certain direction add in phase, and maximum gain is achieved in that direction. Due to the reciprocal nature of adaptive antennas, this approach is also generally applicable to focus the direction of transmitted energy from the antenna array for transmission as well.

In adaptive processing, the amplitude and phases of the individual array RF signals can be adjusted. To adjust the amplitude and phases of the individual array RF signals, complex weighting parameters can be used to modify the phase and amplitudes of each RF path of the adaptive array. The weighting parameters can be updated. Weighting parameter updating is usually accomplished adaptively to satisfy a chosen optimization criteria. There are several commonly used adaptive algorithms available for updating the weighting parameters. These include gradient based algorithms, recursive methods, and other such as the constant modulus method (CMA).

The adaptive array requires transceiver apparatus chains for operation. A transceiver apparatus chain can include an antenna element, a "receive apparatus chain," and a "transmit apparatus chain." Thus, each antenna element is provided a dedicated "receive apparatus chain" and "transmit apparatus chain." For example, a "receive apparatus chain" may include cables, filters, RF electronics, physical connections, and an analog-to-digital converter, assuming the processing is digital. Likewise, each antenna array element along with its corresponding cables and the corresponding transmit electronics from the respective digital signal processor to the respective antenna elements shall be referred to as the "transmit apparatus chain" for each antenna element.

The BTS can include an adaptive array with two or more RF traffic transceiver apparatus chains and a RF beacon transceiver apparatus chain. As described above, the transceiver apparatus chains can include an antenna element, a receive apparatus chain, and a transmit apparatus chain. A radio signal can be transmitted at a traffic frequency from each RF traffic transceiver apparatus chains. If the BTS is designed for time division multiple access, the traffic frequency can be divided into a plurality of time slots. For example, Global System for Mobile communication (GSM) based systems typically divide a traffic frequency into eights time slots that are commonly referred to as burst periods. Each time slot can provide channel information to transmit communication traffic.

The RF beacon transceiver apparatus chain can be similar to the RF traffic transceiver apparatus chains. A radio signal can be transmitted at a beacon frequency from the RF beacon transceiver apparatus chain. For example, a GSM specification can define certain information communicated by the BTS on a beacon frequency. Typically, the beacon frequency is a frequency other than the traffic frequency. Similar to the traffic frequency used by a BTS designed for time division multiple access, the RF beacon frequency can be divided into a plurality of time slots. For example, Global System for Mobile communication (GSM) based systems typically divide a beacon frequency into eight time slots. The first time slot of the beacon frequency can provide given channel information to allow a mobile unit access to the BTS. The other time slots of the beacon frequency can provide channel information to transmit communication traffic.

A BTS requires calibration of the adaptive antenna system to compensate for RF path variations due to environmental conditions. The adaptive antenna system will have calibration values for radio signals transmitted from the BTS. It should be noted that the phase and amplitude shifts that occur in the transmit apparatus chains are, in general, frequency dependant. Thus, in broadband applications, calibration values must generally be determined at the plurality of carrier frequencies used, or at least a sampling of these frequencies.

SUMMARY

The invention concerns a calibration method for calibrating an adaptive array in a wireless cellular telecommunication system. The wireless cellular telecommunication system can have a frequency hopping adaptive base transceiver station (BTS). The BTS can comprise an adaptive antenna array with two or more RF traffic transceiver apparatus chains. The RF traffic transceiver apparatus chains can include an antenna element, a receive apparatus chain, and a transmit apparatus chain. The BTS can communicate with mobile units on frequencies defined by a hop list. The method for calibration of an adaptive array can include the step of periodically interrupting a frequency hopping process of the BTS while one or more calls are in progress. The frequency hopping process of the BTS can be resumed after the calibration process is completed.

The method of calibration can further include calibrating an antenna transmit path for one or more of the RF traffic transceiver apparatus chains at a frequency selected to include one or more frequencies in the hop list to determine a set of weighting parameters for the antenna transmit path at the one or more frequencies. The weighting parameters can be stored in a memory device within the BTS. The weighting parameters can be used to automatically modify the phase and amplitude of each transmit path of the adaptive array.

The method of calibration can be performed during times of low mobile unit activity. For example, the times of low mobile unit activity can be defined by a time list stored in a memory device within the BTS. Alternatively, the BTS can detect a period of low mobile unit activity by determining the number of calls in progress.

According to another aspect of the invention, incoming calls and the calls in progress can be routed to a RF beacon transceiver apparatus chain for the duration of the calibration process. The RF beacon transceiver apparatus chain can include an antenna element, a transmit apparatus chain and a receive apparatus chain, which allow the BTS to transmit and receive radio signals from mobile units at a beacon frequency. The beacon frequency is typically a frequency other than one of the frequencies in the hop list.

According to another aspect of the invention, the BTS can establish a link with a transceiver unit, such as a mobile telephone. The transceiver unit can receive a signal transmitted from the BTS. After receipt of the signal, the transceiver unit can measure a calibration value of the signal. The transceiver unit can also transmit a signal including the calibration value to the BTS.

A self-calibrating frequency hopping adaptive base transceiver station (BTS) is also provided. The BTS can include an adaptive antenna array with two or more traffic transceiver apparatus chains. The BTS can communicate with mobile units on frequencies defined by the hop list.

The system can provide circuitry and software for periodically interrupting a frequency hopping process of the BTS while two or more calls are in progress. For example, this process can be performed periodically during times of low mobile unit activity. The times of low mobile unit activity can be defined by a time list stored in a memory device within the BTS or can be dynamically determined by the BTS based on the number of calls in progress. The frequency hopping process of the BTS can be resumed after the calibration process is completed.

The system can include suitable circuitry and programming for calibrating an antenna transmit path for one or more of the RF traffic transceiver apparatus chains. Each antenna transmit path can be calibrated at a frequency selected to include one or more frequencies in the hop list to determine a set of weighting parameters for an adaptive array. The weighting parameters can be stored in a memory device of the BTS. The weighting parameters can be used to automatically modify the phase and amplitude of each transmit path of the adaptive array.

According to an aspect of the invention, incoming calls and the calls in progress can be routed to a RF beacon transceiver apparatus chain during the calibration process. The RF beacon transceiver apparatus chain can include an antenna element, a transmit apparatus chain, and a receive apparatus chain, which allow the BTS to transmit and receive radio signals from mobile units at a beacon frequency. The beacon frequency is a frequency other than one of the frequencies in the hop list.

According to another aspect of the invention, the BTS can establish a link with a transceiver unit, such as a mobile telephone. The transceiver unit can receive a signal transmitted from the BTS. The transceiver unit can measure a calibration value. The transceiver unit can also transmit a signal including the calibration value to the BTS.

DETAILED DESCRIPTION

Figure 1:
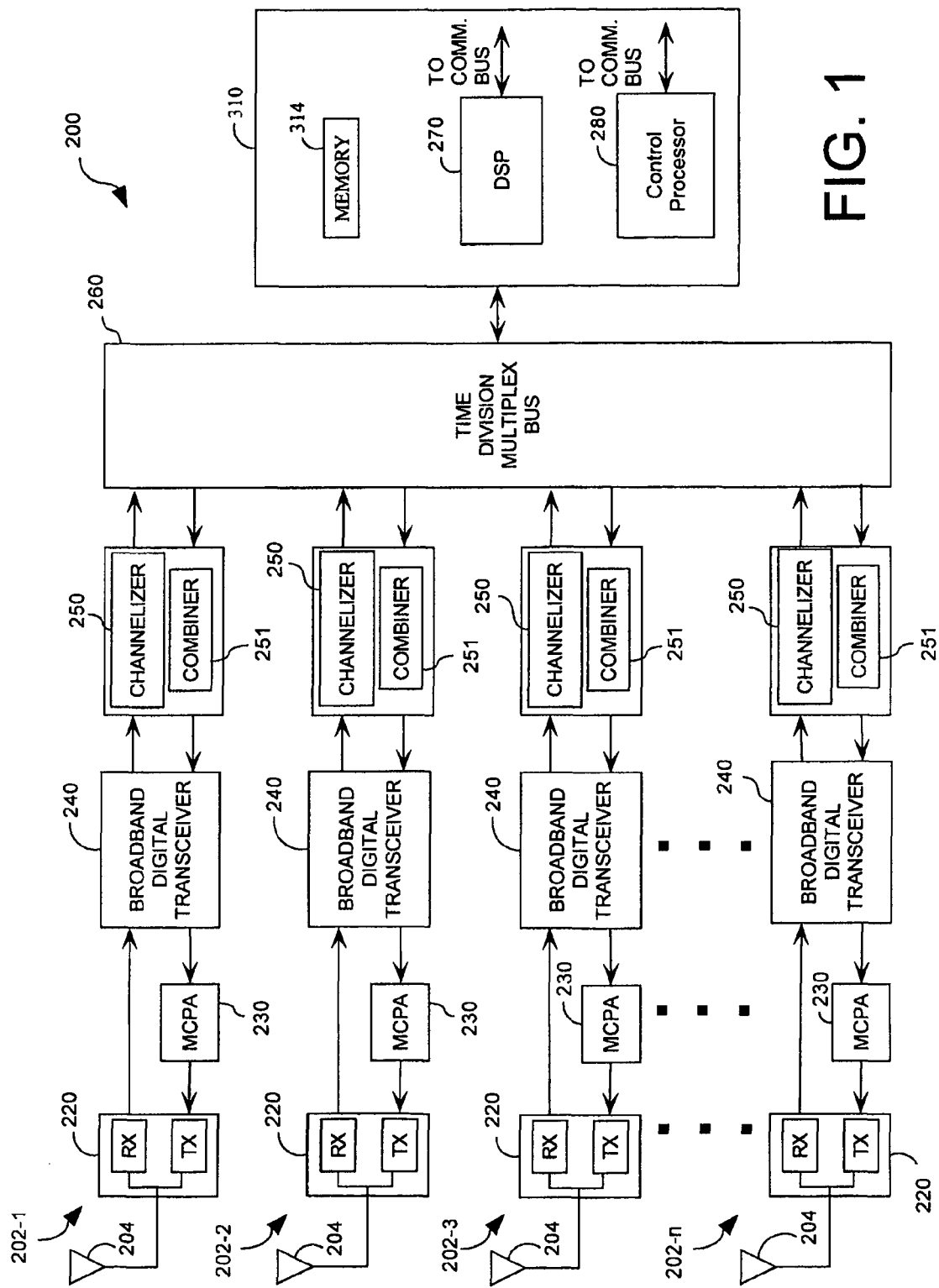
FIG. 1 is a block diagram that is useful for understanding a basic architecture of a wideband base transceiver station.

FIG. 1 is a simplified block diagram of a base station transceiver (BTS) that includes an adaptive array antenna system. The BTS 200 can have a selected number of transceiver apparatus chains 202-1, 202-2, 202-3, 202-n. The BTS 200 shown includes n transceiver apparatus chains. Although four transceiver apparatus chains are shown, the BTS 200 can have two or more transceiver apparatus chains 202-1, 202-2, 202-3, 202-n.

Each transceiver apparatus chain 202-1, 202-2, 202-3, 202-n will typically include an antenna element 204, a dedicated receive apparatus chain, and a dedicated transmit apparatus chain. The receive apparatus chain comprises a filter/duplexer 220, a broadband digital transceiver 240, a channelizer/combiner 250 (including analog to digital converter), a digital signal processor board 270, and associated connectors inclusive. A suitable interface such as a time division multiplex bus 260 can be provided for facilitation of communications between the dedicated receive apparatus chain and the digital signal processor board 270. The digital signal processor board 270 can perform adaptive array beam forming. Those skilled in the art will appreciate that the architecture shown in FIG. 1 is provided merely by way of example. The invention is not limited to any particular transceiver architecture.

Referring again to FIG. 1, the transmit apparatus chain comprises a duplexer 220, a multi-carrier power amplifier (MCPA) 230, a broadband digital transceiver 240, a combiner 251 (including digital to analog converter), a time division multiplex bus 260, a digital signal processor board 270, and associated connectors inclusive. Similar to its function on the receive path, the digital signal processor board 270 can perform adaptive array beam forming. The digital signal processor board 270 can also apply any other desired signal processing to the transmitted signals.

According to an embodiment of the invention, the BTS 200 can comprise an adaptive array with RF traffic transceiver apparatus chains 202-2, 202-3, 202-n and a RF beacon transceiver apparatus chain 202-1. A radio signal can be transmitted from each RF traffic transceiver apparatus chains 202-2, 202-3, 202-n at a frequency defined in the hop list. For example, a GSM based system typically divides a frequency into a plurality of time slots. Each time slot can provide channel information for transmitting communications. For example, if radio signals with different frequencies divided into eight time slots are transmitted from N RF traffic transceiver apparatus chains 202-2, 202-3, 202-n then there are N×8 time slots for providing channel information for transmitting communications.

A radio signal can be transmitted from the RF beacon transceiver apparatus chain 202-1 at a beacon frequency. The beacon frequency is a frequency other than one of the frequencies defined in the hop list. As discussed above, a GSM based system typically divides a frequency into a plurality of time slots. Similar to the frequencies defined in the hop list, the RF beacon frequency can be divided into eight time slots. However, the first time slot of the beacon frequency can provide channel information for a first channel to allow a mobile unit, such as a mobile telephone, access to the BTS 200. The other time slots of the beacon frequency can provide channel information for the additional channels to transmit and receive communications.

The BTS 200 can include a control unit 310. The control unit 310 can comprise a memory 314, a digital signal processor board 270, and a control processor 280. The memory 314 provides a data store for storing data. The digital signal processor board 270 can provide signal processing, for example beam forming, signal modulation, signal calibration, etc. The digital signal processor board 270 can include a plurality of individual digital signal processors for performing these tasks for each channel.

The control processor 280 can be provided for controlling the operation of the major system components including the time division multiplex bus 260, each channelizer 250, each combiner 251, each broadband digital transceiver 240, and each MCPA 230. The control processor 280 can communicate with these system components 250, 251, 240, 230 using the time division multiplex bus 260 or by any other suitable means. Where an adaptive array approach is used, the control processor 280 can adjust a phase, amplitude or both for RF signals associated with all of the transceiver apparatus chains 202-1, 202-2, 202-3, 202-n. These operations can be performed in the channelizer 250 and the combiner 251 or within the digital signal processor board 270. In this way the system can combine the RF signals to create an antenna pattern comprising a major lobe exhibiting gain in a direction of selected mobile units, such as mobile telephones. The control processor 280 can also adjust a phase and/or amplitude of RF signals associated with each of the plurality of transceiver apparatus chains 202-1, 202-2, 202-3, 202-n for combining the RF signals to create an antenna pattern comprising nulls in the direction of one or more mobile units concurrently operating on the common RF carrier frequency.

The control processor 280 can be provided for controlling frequency hopping of the BTS 200. The BTS 200 can perform frequency hopping by rapidly changing the frequency of a transmission of the BTS 200. The BTS can "hop" from frequency to frequency over a wide band. The control processor 280 can be provided for controlling the assignment of a given hop list to the radio hardware 230, 240, 250, 260 of the BTS 200. The control processor 280 can further be provided for controlling the selection of a frequency from the hop list for use in a signal transmission by the BTS 200. The control processor 280 can also include a frequency hopping code sequence for determining the order in which the frequencies are occupied. For example, the frequency hopping code sequence can provide a list (hop list) of frequencies for hopping such that a fixed pattern of a given number of frequencies at a given time is performed in repetition. The control processor 280 can be provided for controlling the interruption of frequency hopping of the BTS 200. By interrupting the frequency hopping of the BTS 200, the call capacity of the BTS 200 can be decreased.

The control processor 280 can be provided for controlling incoming calls and calls in progress. The control processor 280 can be provided for controlling the routing of incoming calls and calls in progress to an available time slot of a frequency defined in the hop list during a normal call processing mode. When the frequency hopping of the BTS 200 is interrupted, the control processor 280 can be provided for controlling the routing of incoming calls and calls in progress to an available time slot of the beacon frequency.

The BTS 200 can undergo a calibration of RF paths respectively associated with the transceiver apparatus chains 202-1, 202-2, 202-3, 202-n to adequately compensate for RF path delays due to environmental conditions. According to an embodiment of the invention, a calibration method for calibrating the adaptive array is provided. The calibration method uses a transceiver unit to receive a signal transmitted by the BTS 200. Where an adaptive array approach is used, the BTS 200 can simultaneously transmit radio signals using RF traffic transceiver apparatus chains 202-2, 202-3, 202-n of the antenna array. During the calibration process, the frequency hopping process of the BTS 200 can be interrupted. While the frequency hopping process is interrupted, incoming calls and calls in progress can be routed to the RF beacon transceiver apparatus chain 202-1. Upon receipt of the signal transmitted by BTS 200, the transceiver unit can measure a calibration value. The transceiver unit can transmit a signal including the calibration value to the BTS 200. As described above, the BTS 200 can include a control processor 280 and a memory 314. The control processor 280 can include programming for populating the memory 314 with the calibration values according to a given population scheme, such as a table format. The control processor 280 can further include programming to determine weighting parameters using the calibration values. According to an embodiment of the invention, a mobile telephone may be used as the transceiver unit for the calibration of adaptive array of the BTS 200.

A person skilled in the art can appreciate that there are many calibration methods for calibrating an adaptive array. Any suitable method of calibrating an adaptive array may be employed without limitation. All that is necessary is a series of measurements that allow determination of any variation of phase and/or amplitude from one transceiver apparatus chain relative to the others, or to some reference. Once this information is determined for each transceiver apparatus chain, any variations between transceiver apparatus chains can be modified using suitable hardware and software adjustments.

For example, one method of calibration can include a serial approach that defines one transmit apparatus chain as a reference transmit apparatus chain. Each of the other transmit apparatus chains used by the adaptive array can then be evaluated one at a time relative to the reference transmit apparatus chain. Specifically, a calibration process can be used to determine the relative difference in phase and amplitude of each of the other transmit apparatus chains as compared to the phase and amplitude of the reference path. This calibration process can be performed for each transmit apparatus chain, at each frequency in the hop list.

Various methods can be used to determine the relative phase and amplitude differences for each transmit apparatus chain relative to phase and amplitude of the reference transmit apparatus chain. For example, a signal can be transmitted concurrently at the same RF frequency using the reference transmit apparatus chain and one of the other transmit apparatus chains to be calibrated. These RF signals can be both received by a remote transceiver unit. The remote transceiver unit will periodically send reports back to the base transceiver station indicating a received signal strength of the combined signals from the two transmit apparatus chains. A phase of the signal transmitted on the transmit apparatus chain to be calibrated can be varied to achieve a nulling effect in a direction corresponding to the azimuth of the remote transceiver unit. When a maximum null is achieved in the direction of the remote transceiver unit, this can be an indication that the phases of the reference transmit apparatus chain and the transmit apparatus chain to be calibrated are exactly 180 degrees out of phase. Thereafter, the amplitude of the signal transmitted by the transmit apparatus chain under calibration can be varied to further enhance the nulling effect in the direction of the remote transceiver.

When a maximum nulling effect for a particular transmit apparatus chain is achieved, the amplitude and phase of the reference transmit channel and the transmit channel being calibrated will be substantially equal. The foregoing process can be repeated for each additional transmit apparatus chain used as part of the adaptive antenna processing system. After the calibration process for each transmit apparatus chain is completed, the phase and amplitude adjustment values can be stored in a data store. The adjustment values determined to achieve the best null for each transmit apparatus chain at a particular frequency can be used as calibration factors for that transmit apparatus chain when broadcasting at that frequency in the hop list. In order to verify that the foregoing calibration process has produced an effective system calibration, the entire adaptive array can be used to focus RF energy toward the remote transceiver unit. The entire adaptive array can also be used to generate a null in the direction of the remote transceiver unit. The difference in signal levels received by the remote transceiver unit under these two conditions can be used to determine a relative difference between peak gain and maximum null. This value can be compared to a predetermined value to determine if the adaptive array is functioning properly. Other antenna patterns can also be generated with the adaptive array to test the overall system calibration.

Figure 2:
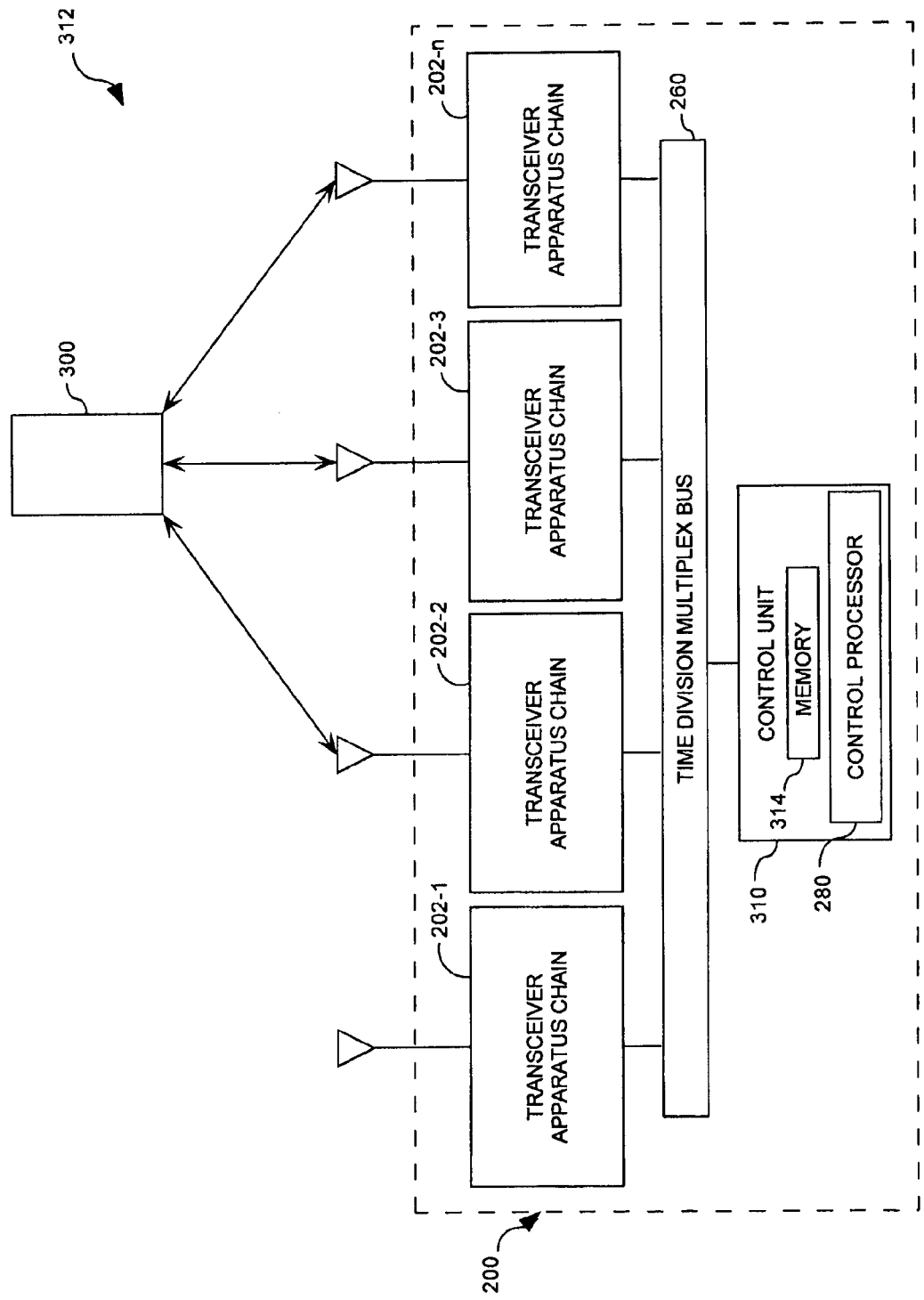
FIG. 2 is a block diagram of a calibration system for performing the calibration process according to an embodiment of the invention.

FIG. 2 is a block diagram of a calibration system for performing a calibration method according to an embodiment of the invention. The calibration system 312 comprises a transceiver unit 300 and the BTS 200 shown in FIG. 1. The BTS 200 comprises transceiver apparatus chains 202-1, 202-2, 202-3, 202-n, a time division multiplex bus 260, and a control unit 310. The description above will suffice with respect to the similar components.

The BTS 200 can establish a RF link to the transceiver unit 300 by transmitting a radio signal to the transceiver unit 300. The BTS 200 can maintain a connection with the transceiver unit 300 by providing a receive path, as described above.

The transceiver unit 300 can receive a RF signal transmitted from the BTS 200. Upon receipt of the signal, the transceiver unit 300 can measure a calibration value, such as the total power, of the signal transmitted by the BTS 200. The calibration value can be used to compensate for relative RF path phase delay and amplitude variations that occur when signals traverse a transmit apparatus chain, with reference to fixed reference values. After performing the measurement of the calibration value, the transceiver unit 300 can transmit a calibration signal including the calibration value to the BTS 200. The transceiver unit 300 can be a free standing device apart from the BTS 200 or can be mounted on the BTS 200.

The control processor 280 can be provided for controlling the methodic adjustment of the weighting parameters during a calibration process. The control processor 280 can further be provided for controlling the adjustment of the weighting parameters for a signal transmitted from a first RF traffic transceiver apparatus chain 202-2, 202-3, 202-n. The control processor 280 can further be provided for repeating the adjustment of weighting parameters for a signal transmitted from a second RF traffic transceiver apparatus chain 202-2, 202-3, 202-n.

The weighting parameters used in the calibration process can be determined as follows:

$$w_1(t)=X(t)*e^{j\Phi 1}$$

$$w_2(t)=X(t)*e^{j\Phi 2}$$

$$\ldots$$

$$w_M(t)=X(t)*e^{j\Phi M}$$

x(t) is the "Transmitted Signal". w(t) is the input to the "Tunable Radio." $\Phi$ is the phase for each RF traffic transceiver apparatus chain {1 . . . M} of the antenna array.

The control processor 280 can be provided for controlling the population of the memory 314 with the calibration values, described above. The memory 314 can be populated in accordance with a defined memory propagation scheme, such as a table format. The table can include a column for each RF traffic transceiver apparatus chain 202-2, 202-3, 202-n and a row for each weighting parameter per frequency used during a calibration process.

The control processor 280 can be provided for controlling the determination of the weighting parameters. The weighting parameter determination process can include selecting a set of weighting parameters using the calibration values. The weighting parameters can be used to point the antenna beam and nulls into the desired directions relative to the fixed reference values. The weighting parameters can be associated with each minimum calibration value for each frequency used in the calibration process per RF traffic transceiver apparatus chains 202-2, 202-3, 202-n. The weighting parameters can be stored in memory 314 according to a defined memory propagation scheme, such as a table format. For example, a calibration system 312 comprising N RF traffic transceiver apparatus chains 202-2, 202-3, 202-n and M frequencies in a hop list can result in a table with N weighting parameter entries for each of the M frequencies. The weighting parameters can be used to automatically modify the phase and amplitude of each transmit path of each traffic transceiver apparatus chain 202-2, 202-3, 202-n.

Those skilled in the art will appreciate that the system (hardware and software) architecture illustrated in FIG. 2 is one embodiment of a calibration system in which the calibration process described below can be implemented. However, the invention is not limited in this regard and any other suitable calibration system architecture can be used without limitation.

Figure 3A:
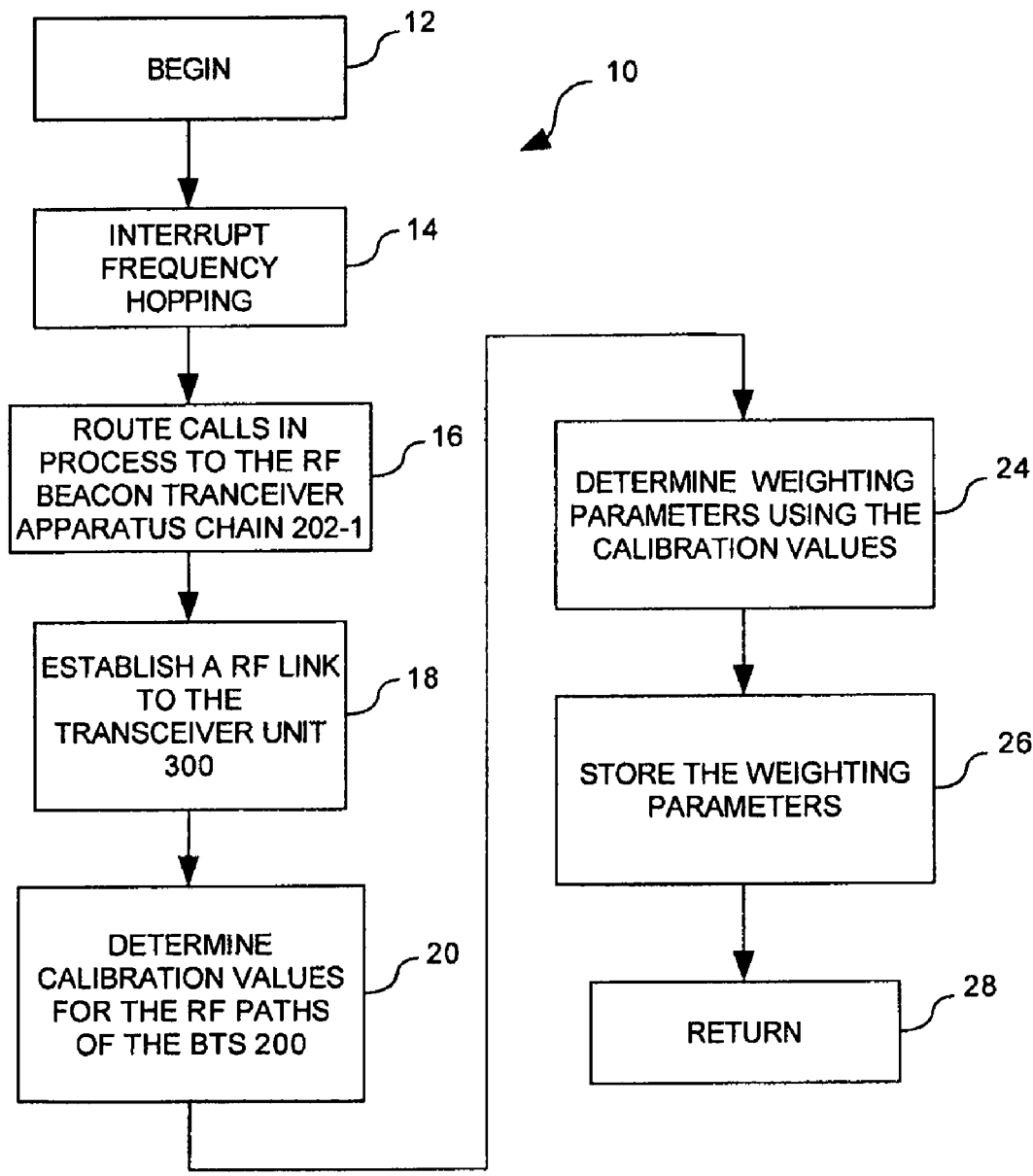
FIG. 3A is a flow chart for a calibration method according to an embodiment of the invention.

FIG. 3A is a flow chart of a calibration method according to an embodiment of the invention. The calibration method 10 comprises the calibration of one or more RF paths of the BTS 200. The calibration method 10 begins at step 12 and continues with step 14. In step 14, the frequency hopping process of the BTS 200 is interrupted. Upon interrupting the frequency hopping process of the BTS 200, incoming calls and calls in progress are routed to the RF beacon transceiver apparatus chain 202-1. Upon routing the incoming calls and calls in progress, the BTS 200 establishes a RF link to the transceiver unit 300 at step 18. After establishing a link to the transceiver unit 300, calibration values for the RF paths of the BTS 200 are determined at step 20. After determining the calibration values for the RF paths, step 24 is performed. In step 24, weighting parameters are determined using the calibration values. After determining the weighting parameters, the weighting parameters are stored in memory 314 at step 26. After the weighting parameters are stored, step 28 is performed where calibration method 10 returns to step 12.

Figure 3B:
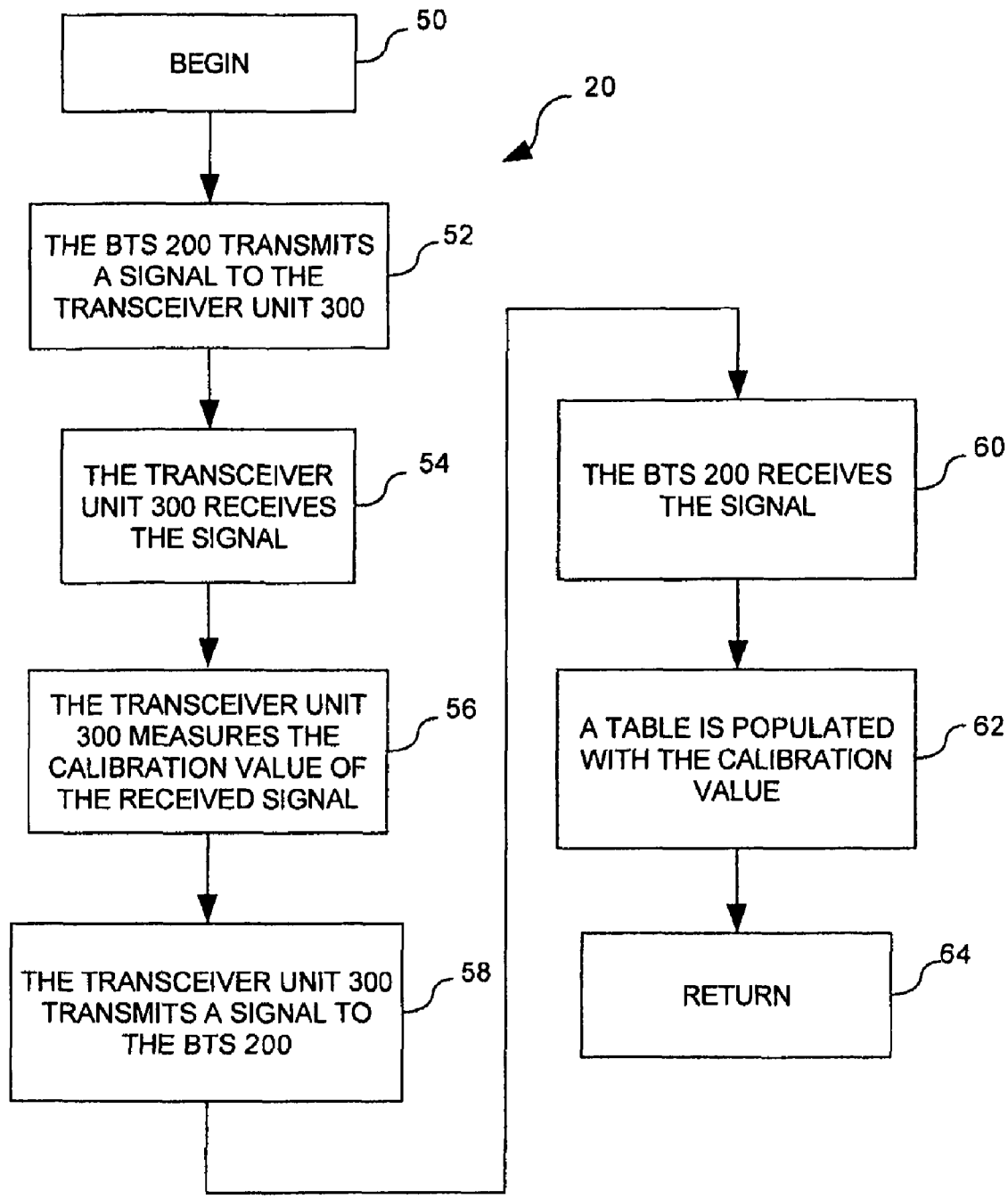
FIG. 3B is a flow chart that shows a sub-process including a series of steps that together comprise the calibration step shown in FIG. 3A.

FIG. 3B is a flow chart that shows a sub-process including a series of steps that together comprise step 20 shown in FIG. 3A. According to an embodiment of the invention, step 20 begins at step 50 and continues with step 52. In step 52, the BTS 200 transmits a signal through each transmit apparatus chain of the RF traffic transceiver apparatus chains 202-2, 202-3, 202-n to the transceiver unit 300. After transmitting the signal to the transceiver unit 300, the transceiver unit 300 receives the signal at step 54. Upon receipt of the signal, the transceiver unit 300 measures a calibration value, for example a total power value, of the signal at step 56. After step 56, the transceiver unit 300 transmits a signal including the calibration value to the BTS 200 at step 58. After step 58, the BTS 200 receives the signal including the calibration value at step 60. At step 62, a table is populated with the calibration value. After populating the table with the calibration value, step 64 is performed where step 20 returns to step 50.

The sub-process shown in FIG. 3B can be repeated. For example, the weighting parameters can be methodically adjusted for a first frequency in the hop list, and repeated for a second frequency in the hop list. The calibration values can be measured for a RF path of a first RF traffic transceiver apparatus chain 202-2, 202-3, 202-n and repeated for a second RF traffic transceiver apparatus chain 202-2, 202-3, 202-n.

A person skilled in the art can appreciate that the calibration process shown in FIG. 3B is one method of calibrating the adaptive array of the BTS 200. Any other suitable methods of calibrating an adaptive array may be employed without limitation.

The calibration method 10 shown in FIG. 3A and FIG. 3B can be performed during times of low mobile unit activity within an hour, a day, or a week to avoid interrupting normal call processing at peak activity times during a day. For example, the times of low mobile unit activity can be defined by a time list stored in a memory device within the BTS. Alternatively, the BTS can detect a period of low mobile unit activity by determining the number of calls in progress.

The calibration method 10 can be periodically performed to adequately compensate for RF path variations due to environmental conditions. For example, the lengths of RF cables and jumpers between the BTS 200 and the RF traffic transceiver apparatus chains 202-2, 202-3, 202-n up to a few hundred feet away can expand and contract (and result in corresponding phase and amplitude variations in the RF path which can impact adaptive beam forming performance) with heating and cooling from sun, day/night, weather and other environmental factors. Devices such as surface acoustic wave (SAW) filters found in the BTS 200 are particularly sensitive to temperature and are known to produce significant changes in signal shift from modest changes in temperature.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

What is claimed is:
1. A method comprising:
directing RF energy to a first mobile unit to obtain a first signal level, by an entire adaptive base transceiver station having an adaptive antenna array including an RF traffic transceiver apparatus chain;
generating, by said entire adaptive base transceiver station, a null in a direction of said first mobile unit to obtain a second signal level;
obtaining a peak gain derived from said first signal level and said second signal level,
wherein said directing is in response to a periodic interruption of a frequency hopping process while a call is in progress,
wherein said periodically interrupting comprises routing said call to an RF beacon transceiver apparatus,
calibrating an antenna transmit path for said RF traffic transceiver apparatus chain at a selected frequency to determine a set of weighting parameters for said antenna transmit path at said selected frequency; and
returning said call to said frequency hopping process.
2. The method of claim 1, wherein said first mobile unit comprises a mobile telephone.
3. The method of claim 1, wherein said calibrating comprises calculating adjustment values to achieve said null for said RF traffic transceiver apparatus chain.
4. The method of claim 1, wherein said entire adaptive base transceiver station performs said frequency hopping process.
5. The method of claim 1, further comprising performing said calibrating during times of low mobile unit activity.
6. The method of claim 5, further comprising selecting said times of low mobile unit activity from predetermined times defined by a time list.
7. The method of claim 1, further comprising detecting a period of low mobile unit activity by determining a number of calls in progress.
8. The method of claim 1, further comprising automatically applying said set of weighting parameters to a signal path to modify a phase and amplitude of said antenna transmit path.
9. The method of claim 1, wherein said calibrating further comprises establishing an RF link with a transceiver unit.
10. The method of claim 9, wherein said transceiver unit comprises a mobile telephone.
11. An article of manufacture including a non-transitory computer readable medium having instructions stored thereon that, in response to execution by a computing device, cause said computing device to perform operations comprising:

directing RF energy to a first mobile unit to obtain a first signal level, by an entire adaptive base transceiver station having an adaptive antenna array including an RF traffic transceiver apparatus chain;

generating, by said entire adaptive base transceiver station, a null in a direction of said first mobile unit to obtain a second signal level;

obtaining a peak gain derived from said first signal level and said second signal level, wherein said directing is in response to a periodic interruption of a frequency hopping process while a call is in progress, wherein said periodically interrupting comprises routing said call to an RF beacon transceiver apparatus, calibrating an antenna transmit path for said RF traffic transceiver apparatus chain at a selected frequency to determine a set of weighting parameters for said antenna transmit path at said selected frequency; and returning said call to said frequency hopping process.

12. The article of manufacture of claim 11, the operations further comprising, prior to said directing, periodically interrupting a frequency hopping process while a call is in progress.

13. The article of manufacture of claim 11, wherein said first mobile unit comprises a mobile telephone.

\* \* \* \* \*

UNITED STATES PATENT AND TRADEMARK OFFICE
CERTIFICATE OF CORRECTION

PATENT NO. : 8,116,817 B2  Page 1 of 1
APPLICATION NO. : 12/622956
DATED : February 14, 2012
INVENTOR(S) : Noll et al.

It is certified that error appears in the above-identified patent and that said Letters Patent is hereby corrected as shown below:

Title page, item (57), under "Abstract", in Column 2, Line 8, delete "on a frequencies" and insert -- on frequencies --.

Signed and Sealed this
Fourteenth Day of August, 2012

David J. Kappos
*Director of the United States Patent and Trademark Office*